(12) United States Patent
Golov

(10) Patent No.: US 11,847,338 B2
(45) Date of Patent: Dec. 19, 2023

(54) MASTER SLAVE MANAGED MEMORY STORAGE

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/942,545

(22) Filed: Jul. 29, 2020

(65) Prior Publication Data

US 2022/0035557 A1 Feb. 3, 2022

(51) Int. Cl.
*G06F 3/06* (2006.01)

(52) U.S. Cl.
CPC .......... *G06F 3/0653* (2013.01); *G06F 3/064* (2013.01); *G06F 3/0604* (2013.01); *G06F 3/0614* (2013.01); *G06F 3/0631* (2013.01); *G06F 3/0649* (2013.01); *G06F 3/0659* (2013.01); *G06F 3/0683* (2013.01)

(58) Field of Classification Search
CPC .... G06F 3/0653; G06F 3/0604; G06F 3/0614; G06F 3/0631; G06F 3/064; G06F 3/0649; G06F 3/0659; G06F 3/0683
See application file for complete search history.

(56) References Cited

U.S. PATENT DOCUMENTS

| 9,870,373 B2* | 1/2018 | Klughart ............... G06F 3/0619 |
| 2013/0073747 A1* | 3/2013 | Klughart ............... G06F 3/0635 |
| | | 710/5 |
| 2017/0249332 A1 | 8/2017 | Klughart |
| 2018/0137896 A1 | 5/2018 | Shin et al. |
| 2020/0401547 A1* | 12/2020 | Kawabe ............... G06F 1/3268 |

* cited by examiner

*Primary Examiner* — Gary W. Cygiel
(74) *Attorney, Agent, or Firm* — Greenberg Traurig

(57) ABSTRACT

Systems, methods, and apparatus related to data storage devices. In one approach, a string of storage devices are chained together and coupled to a host device for storing data. Each storage device may, for example, execute read, write, or erase commands received from the host device. Each storage device in the chain is a master to the next storage device in the chain, and each storage device is a slave to the previous storage device in the chain. In one example, the host device is a system-on-chip. The chain can manage itself and is seen as a single large storage space to the host device. The host device does not require knowledge about each individual storage device, and each storage device does not require knowledge about the other storage devices in the chain (other than whether the storage device is attached to another storage device on its master port).

19 Claims, 6 Drawing Sheets

MASTER SLAVE MANAGED MEMORY STORAGE

FIELD OF THE TECHNOLOGY

At least some embodiments disclosed herein relate to data storage devices in general, and more particularly, but not limited to attaching multiple storage devices to a host device in a master/slave configuration.

BACKGROUND

Various types of non-volatile storage devices can be used to store data. Non-volatile storage devices can include NAND flash memory devices. NAND flash is a type of flash memory constructed using NAND logic gates. Alternatively, NOR flash is a type of flash memory constructed using NOR logic gates. Currently, the use of NAND flash predominates the flash market.

Typical computer storage devices have controllers that receive data access requests from host computers, and perform programmed computing tasks to implement the requests in ways that may be specific to the media and structure configured in the storage devices. In one example, a flash memory controller manages data stored in flash memory and communicates with a computer device. In some cases, flash memory controllers are used in solid state drives for use in mobile devices, or in SD cards or similar media for use in digital cameras.

Firmware can be used to operate a flash memory controller for a particular storage device. In one example, when a computer system or device reads data from or writes data to a flash memory device, it communicates with the flash memory controller.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
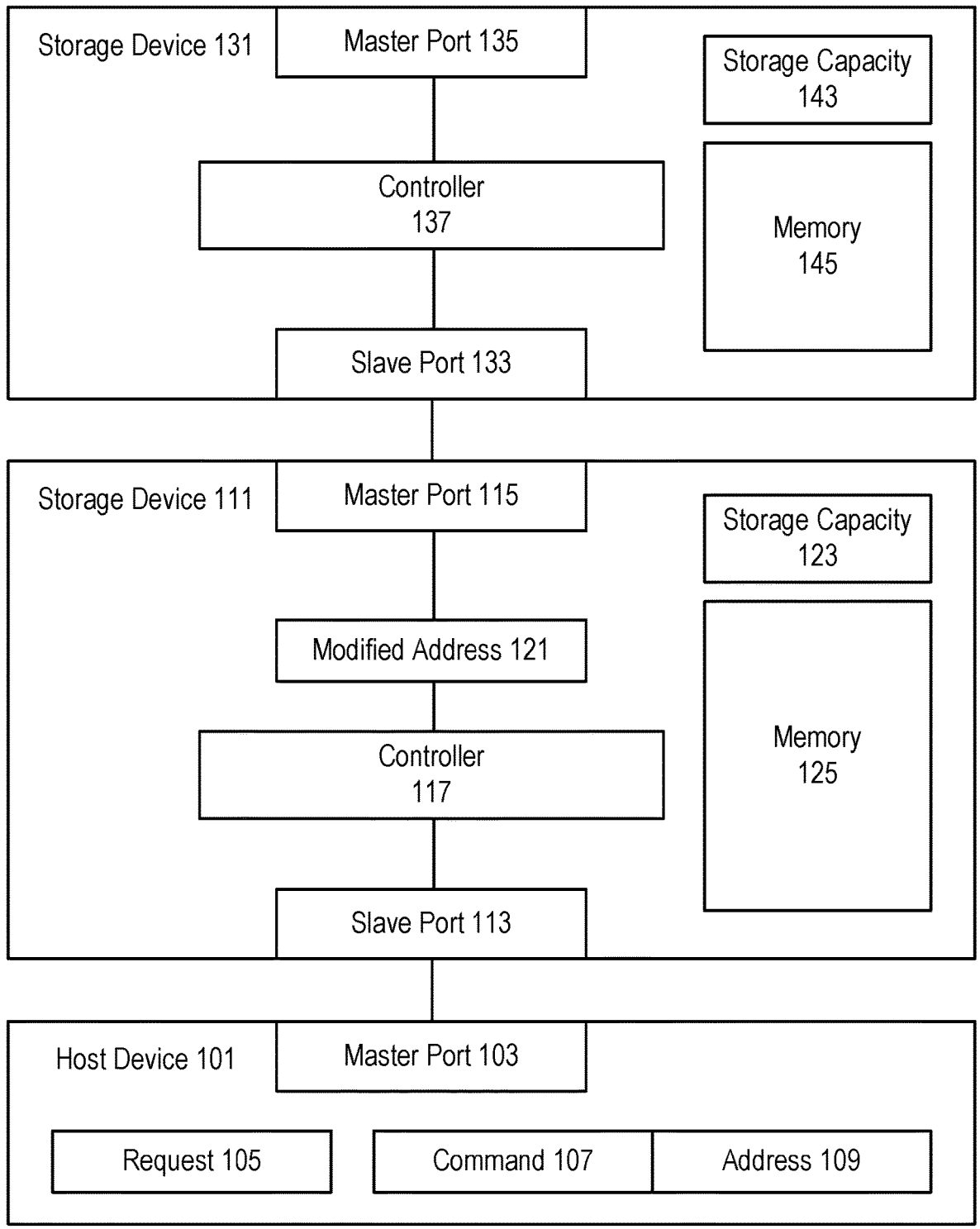
FIG. 1 illustrates a host device with storage devices coupled to the host device in a master/slave configuration, in accordance with some embodiments.

The following disclosure describes various embodiments for attaching multiple storage devices to a host device in a master/slave configuration. Each storage device may, for example, store data used by the host device (e.g., a computing device of an autonomous vehicle, or another computing device that accesses data stored in the chain of storage devices). In one example, the storage device is a solid-state drive mounted in an electric vehicle. In one example, each storage device is a managed storage device such as an SSD, UFS, or eMMC device attached in a master/slave chain to a host system-on-chip. The managed storage device responds to a read, write, or erase request generated by the host.

In some storage systems, overall system storage capacity can be increased by adding more storage devices. Such storage systems typically require either a multi-port host device that can accommodate multiple storage devices, or a communication switch (e.g., a PCIe switch for SSDs). However, multi-port host devices can be limited by the number of ports available for connecting storage devices. Also, communication switches can add cost to the system and increase system power consumption.

Various embodiments of the present disclosure provide a technological solution to one or more of the above limitations. In one embodiment, a string of storage devices are chained together and coupled to a host device. Each storage device in the chain is a master to the next storage device in the chain, and each storage device is a slave to the previous storage device in the chain.

In one example, the host device is a system-on-chip. The chain can manage itself and is seen as a single large storage to the host device. There is no limitation to the length of the chain.

Advantages provided by various embodiments described herein include a simple and cost-effective way to extend storage media capacity with an unlimited number of storage devices while saving power and system cost. For example, there is no need for a switch, which saves system cost and printed circuit board space. A single host device port may support an unlimited number of storage devices, simplifying system design and reducing system cost. Additionally, there are typically no host device changes required.

In one embodiment, a first slave storage device in a chain includes memory (e.g., a NAND-based flash storage media) to store data for a host device. The storage device has a slave port for communicating with the host device, and a master port communicating with a second slave storage device in the chain. The first slave storage device includes a controller that receives a request on the slave port from the host device regarding a storage capacity of the memory.

In response to the request, the controller determines that the second slave storage device is coupled to the master port. In response to determining that the second slave storage device is coupled to the master port, the first slave storage device sends a request regarding storage capacity of the second slave storage device.

The second slave storage device, in response to receiving the request, determines that no other storage device is coupled to the second slave storage device. In response to this determination, the second slave storage device sends its storage capacity to the master port of the first slave storage device.

The controller receives the storage capacity of the second slave storage device. The controller then adds the storage capacities of the first and second slave storage devices to determine a total storage capacity of the chain. In response to the request from the host device, the controller sends the total storage capacity to the host device. In this way, the host device determines available memory capacity for storing data in the chain of storage devices. The above approach is similarly repeated by the second slave storage device and a third slave storage device in the chain, and so on for yet additional slave storage devices in the chain.

In one example, the number of storage devices in the chain is between 3-10, or even 2-50 or more. In one example, one or more of the storage devices includes an internet of things (IoT) device. In one example, the host device is an IoT device.

FIG. 1 illustrates a host device (e.g., host device 101) with storage devices coupled to the host device in a master/slave configuration, in accordance with some embodiments. Host device 101 may be, for example, a computer, embedded computer, server, cloud server, edge server, laptop, tablet, smartphone, or other electronic device controlled by a processing device.

Host device 101 includes a master port (e.g., master port 103). Master port 103 may be used for coupling electronic devices (e.g., storage devices) to host device 101. Master port 103 may provide an interface for passing control, address, data, and other signals between host device 101 and connected electronic devices. Master port 103 may be in the form of a standardized interface.

Master port 103 interface, may be, for example, in accordance with a communication protocol for Peripheral Component Interconnect express (PCIe), NVMe (NVM Express, or Non-Volatile Memory Host Controller Interface Specification (NVMHCIS)), Serial Advanced Technology Attachment (SATA), Serial Attached SCSI (SAS), Universal Serial Bus (USB), Storage Area Network (SAN) and/or IEEE-1394 interface, or other interface.

A storage device (e.g., storage device 111) may be coupled to master port 103 of host device 101 (e.g., as a first device in a chain of managed storage devices). Storage device (e.g., storage device 111, 131) may be, for example, a magnetic hard drive, Solid State Drive (SSD), memory card, eMMC, UFS, or other storage device.

Storage device 111, 131 includes memory (e.g., memory 125, 145). Memory 125, 145 may be non-volatile memory or may include both non-volatile and volatile memory. For example, memory 125, 145 may contain flash memory (e.g., SLC, MLC, TLC, QLC, etc.), cross point memory, DRAM, SRAM, other memory technologies, or any combination of memory technologies. Memory 125, 145 may be provided in any form including, for example, solid-state drive, compact flash module, PCIe card, NVMe module, DIMM, SIMM, soldered to a printed circuit board, one or more die stacked and packaged with other integrated circuit components, or other form factor.

Examples of non-volatile memory include flash memory, memory units formed based on negative-and (NAND) logic gates, negative-or (NOR) logic gates, Phase-Change Memory (PCM), magnetic memory (MRAM), resistive random-access memory (RRAM), cross point memory and other memory devices. A cross point memory device may use transistor-less memory elements, each of which has a memory cell and a selector that are stacked together as a column. Memory element columns are connected via two lays of wires running in perpendicular directions, where wires of one lay run in one direction in the layer located above the memory element columns, and wires of the other lay is in another direction and in the layer located below the memory element columns. Each memory element may be individually selected at a cross point of one wire on each of the two layers. Cross point memory devices are fast and non-volatile and may be used as a unified memory pool for processing and storage. Examples of volatile memory include dynamic random-access memory (DRAM) and static random-access memory (SRAM).

Storage device 111, 131 contains a controller or other processing device (e.g., controller 117, 137). Controller 117, 137 may be, for example, a microprocessor, embedded processor, embedded controller, central processing unit (CPU), system on a chip (SOC), application specific integrated circuit (ASIC), field programmable gate array (FPGA), or other processing device. Controller 117, 137 may be composed of a single processor with a single processing core, a single processor with multiple processing cores, or multiple processors. Controller 117, 137 and memory 125, 145 may be configured on printed circuit boards.

Each storage device 111, 131 includes a slave port (e.g., slave port 113, 133) and a master port (e.g., master port 115, 135). The slave port of a storage device may be coupled to the master port of a host device or other storage device to form a chain of storage devices coupled to the host device. In one example, slave port 113 of storage device 111 is coupled to master port 103 of host device 101, and slave port 133 of storage device 131 is coupled to master port 115 of storage device 111. Slave port 113 provides an interface for passing control, address, data, and other signals between master port 103 of host device 101 and storage device 111, and slave port 133 provides an interface for passing control, address, data, and other signals between master port 115 of storage device 111 and slave port 133 of storage device 131.

In one example, a system includes memory 125 to store data for host device 101, slave port 113 to communicate with host device 101, master port 115 to communicate with storage device 131, and controller 117 to process requests and commands from host device 101. In one example, storage device 111 receives a request (e.g., request 105) regarding storage capacity (e.g., storage capacity identified as a number of logical blocks or as a storage size in bytes of data). In response to request 105, storage device 111 determines that storage device 131 is coupled to storage device 111. Storage device 111 sends a request regarding a second storage capacity (e.g., storage capacity 143) of storage device 131 to storage device 131. In response to the request, storage device 131 determines that no other device, other than storage device 111 is coupled to storage device 131. Storage device 131 sends storage capacity 143 to storage device 111. Storage device 111 receives storage capacity 143 from storage device 131 and adds the storage capacity of storage device 111 (e.g., storage capacity 123) to storage capacity 143 to provide a total storage capacity. Storage device 111 sends the total storage capacity to host device 101, in response to request 105.

For example, storage device 111 may have storage capacity 123 of 2 terabytes and storage device 131 may have storage capacity 143 of 1 terabyte. Total storage capacity reported to host device 101 in response to request 105 is 3 terabytes.

In one example, host device 101 sends request 105 to storage device 111 in response to a power up of host device 101.

In one example, slave port 133 of storage device 131 receives the request from master port 115 of storage device 111. Storage device 131 determines that no storage device is coupled to storage device 131 by determining that no storage device is coupled to master port 135 of storage device 131.

In one example, storage device 111 receives request 105 from host device 101 on slave port 113.

In one example, storage device 111 receives a command (e.g., command 107) and an address (e.g., address 109) associated with command 107 from host device 101. Controller 117 of storage device 111 determines that address 109 exceeds storage capacity 123 of storage device 111, and in response, controller 117 decrements address 109 by storage capacity 123 to provide a modified address (e.g., modified address 121). Storage device 111 sends command 107 and modified address 121 to storage device 131. Storage device 131 determines that modified address 121 is within storage capacity 143, and in response, executes command 107 and sends a result from executing command 107 to storage device 111. Storage device 111 receives the result from storage device 131, and in response to receiving command 107, sends the result to host device 101.

In one example, storage capacity 123 of storage device 111 is 250 logical blocks (LB), and storage capacity 143 of storage device 131 is 100 LB. Storage device 111 has an address range of LB 0-249 and storage device 131 has an address range of LB 0-99. Storage device 111 receives command 107 from host device 101, where command 107 is a read command, and address 109 is LB 275. Controller 117 determines that address 109 (LB 275) exceeds storage capacity 123 (250 LB). Controller 117 decrements address 109 (LB 275) by storage capacity 123 (250 LB) to provide modified address 121 (LB 275−250 LB=LB 25). Storage device 131 receives command 107 and modified address 121 (LB 25) and determines that modified address 121 (LB 25) is within storage capacity 143 (100 LB). Storage device 131 executes command 107 and returns data read from LB 25 to storage device 111. Storage device 111 sends the data read from LB 25 of storage device 131 to host device 101 in response to command 107.

In one example, storage device 111 has slave port 113 to receive command 107 from master port 103 of host device 101, and storage device 111 has master port 115 to send command 107 to slave port 133 of storage device 131.

In one example, storage device 111 receives command 107 and address 109 associated with command 107 from host device 101. Controller 117 of storage device 111 determines that address 109 is within storage capacity 123 of storage device 111, and in response, executes command 107 and sends a result from executing command 107 to host device 101.

In one example, command 107 is a read, write or erase command and address 109 is a logical block address.

In one example, command 107 is a write command and storage device 111 receives data to be stored at address 109. The result sent to host device 101 in response to command 107 indicates that the data has been stored (e.g., the result is an acknowledgement of completion of writing data).

Figure 2:
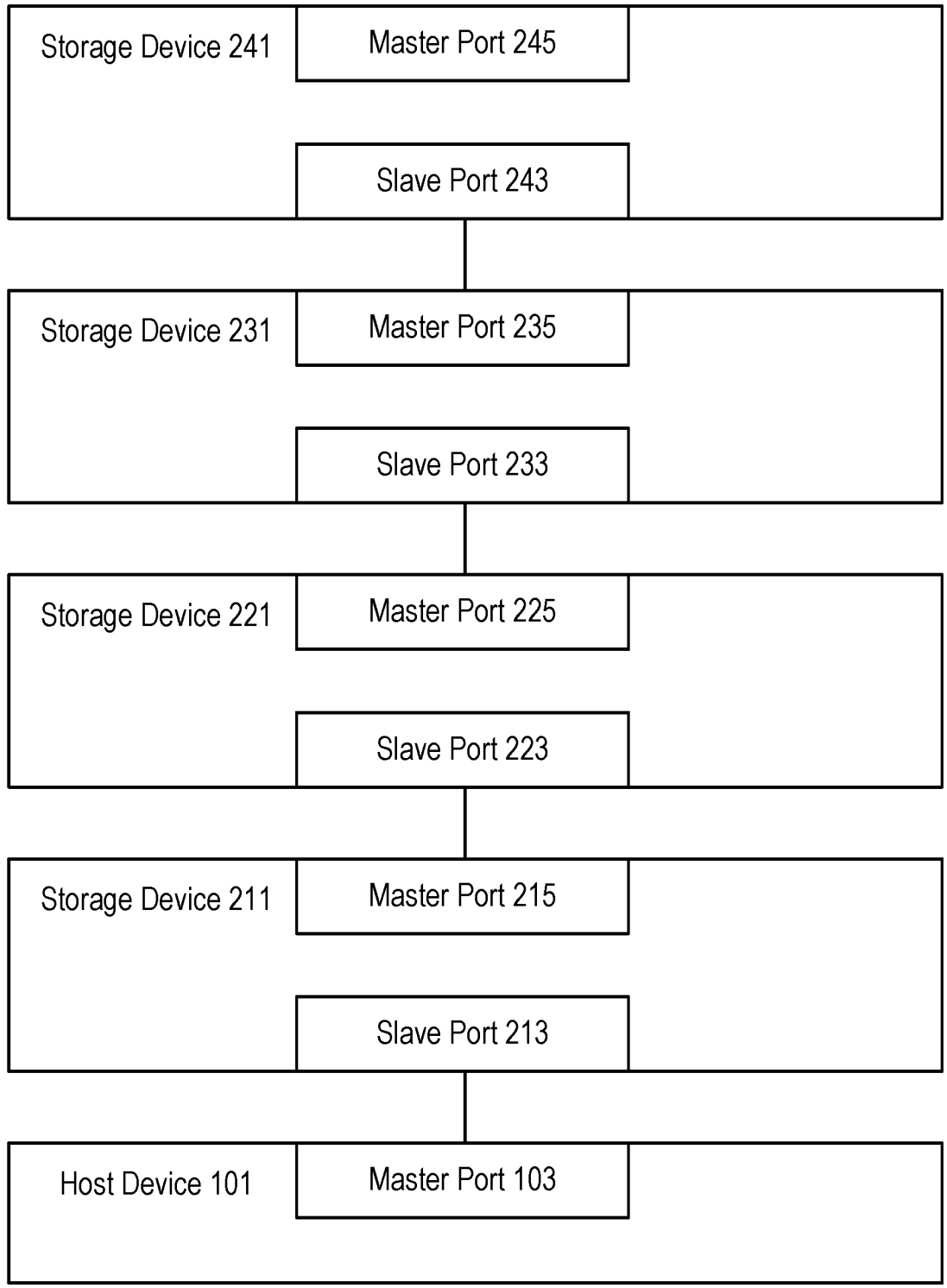
FIG. 2 illustrates a host device with multiple storage devices configured in a chain of master/slave devices and coupled to the host device, in accordance with some embodiments.

FIG. 2 illustrates host device 101 with multiple storage devices configured in a chain of master/slave devices and coupled to host device 101, in accordance with some embodiments. In one example, storage devices (e.g., storage devices 211, 221, 231, 241) are similar to storage device 111 of FIG. 1. An unlimited number of storage devices may be chained together in a master/slave configuration and coupled to host device 101. In one example, master port 103 of host device 101 is coupled to slave port 213 of storage device 211, master port 215 of storage device 211 is coupled to slave port 223 of storage device 221, master port 225 of storage device 221 is coupled to slave port 233 of storage device 231, master port 235 of storage device 231 is coupled to slave port 243 of storage device 241, etc.

Master ports 103, 215, 225, 235, 245 and slave ports 213, 223, 233, 243 may be in the form of one or more standardized interfaces and may be, for example, wired or wireless interfaces.

A wired interface may be, for example, in accordance with a communication protocol for Peripheral Component Interconnect express (PCIe), NVMe (NVM Express, or Non-Volatile Memory Host Controller Interface Specification (NVMHCIS)), Serial Advanced Technology Attachment (SATA), Serial Attached SCSI (SAS), Universal Serial Bus (USB), Storage Area Network (SAN) and/or IEEE-1394 interface, or other interface. Wired interfaces may be implemented by, for example, cables, printed circuit boards, motherboards, backplanes, etc.

A wireless interface may be, for example, in accordance with a communication protocol for Bluetooth, Wireless USB, Infrared Data Association (IrDA), mobile wireless networks such as 4G or 5G, or other wireless interface.

In one example, master ports 103, 215, 225, 235 are wired to slave ports 213, 223, 233, 243 respectively with cables (e.g., cables compatible with SATA, SAS, USB, etc. protocol).

In one example, master ports 103, 215, 225, 235 are coupled to slave ports 213, 223, 233, 243 respectively with interfaces compatible with a wireless protocol (e.g., wireless USB, Bluetooth, etc.).

More than one interface protocol may be used in a chain of storage devices. For example, a chain of storage devices may include wired and wireless interfaces. In one example, slave port 213 of storage device 111 is coupled to master port 103 of host device 101 through a USB compatible cable, and slave port 223 of storage device 221 is coupled to master port 215 of storage device 211 through a wireless USB interface.

Figure 3:
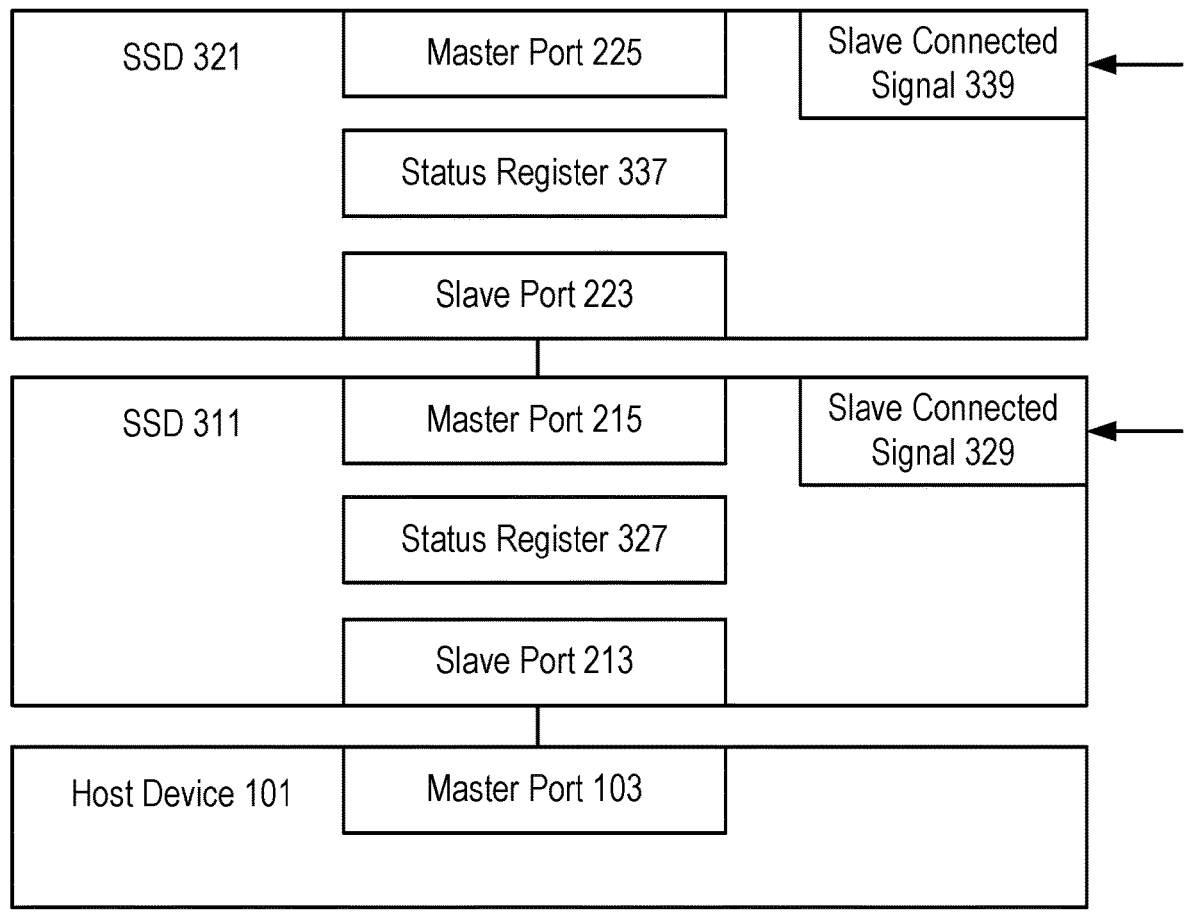
FIG. 3 illustrates a host device with Solid State Drives (SSDs) configured in a chain of master/slave devices and coupled to the host device, in accordance with some embodiments.

FIG. 3 illustrates host device 101 with Solid State Drives (SSDs) 311, 321, configured in a chain of master/slave devices and coupled to host device 101, in accordance with some embodiments. In one example, SSDs 311, 321 are similar to storage device 111 of FIG. 1.

Each of SSD 311, 321 has non-volatile memory that can retain data when SSD 311, 321 is not powered. SSD 311, 321 may be packaged, for example, in a small form factor (SFF) disk format (e.g., SFF-2.5, SFF-1.8, etc.), M.2 module, mSATA module, slimSATA module, flash memory card, embedded USB card, or other form-factor.

SSD 311, 321 may include a slave connected signal (e.g., slave connected signal 329, 339). In one example, the slave connected signal indicates when a slave device is coupled to the master port of a storage device. Slave connected signal 329, 339 is an input to SSD 311, 321. In one example, slave connected signal 329, 339 indicates when a slave device is coupled to the master port of a storage device by changing polarity (e.g., logic 0 or logic 1) when a second storage device is coupled to the master port of a first storage device. In one example, slave connected signal 329 is a logic 0 input to SSD 311 when SSD 321 is coupled to master port 215 of SSD 311, and slave connected signal 339 is a logic 1 input to SSD 321 when no other storage device is coupled to master port 225 of SSD 321.

SSD 311, 321 may include a status register (e.g., status register 327, 337). In one example, the status register indicates when a slave device is coupled to the master port of a storage device. In one example, status register 327, 337 indicates when a slave device is coupled to the master port of a storage device by changing polarity (e.g., logic 0 or logic 1) of one or more bits within the status register when a second storage device is coupled to the master port of a first storage device. In one example, a bit within status register 327 of SSD 311 is a logic 0 when SSD 321 is coupled to master port 215 of SSD 311, and the bit is a logic 1 when no storage device is coupled to master port 215 of SSD 311.

In one example, the polarity of the bit in status register 327, 337 is changed based on a change in status of a wireless connection. In one example, the bit within status register 327 is a logic 0 when a wireless connection is established between master port 215 of SSD 311 and slave port 223 of SSD 321, and the bit is a logic 1 when no wireless connection is established between master port 215 of SSD 311 and slave port 223 of SSD 321.

Figure 4:
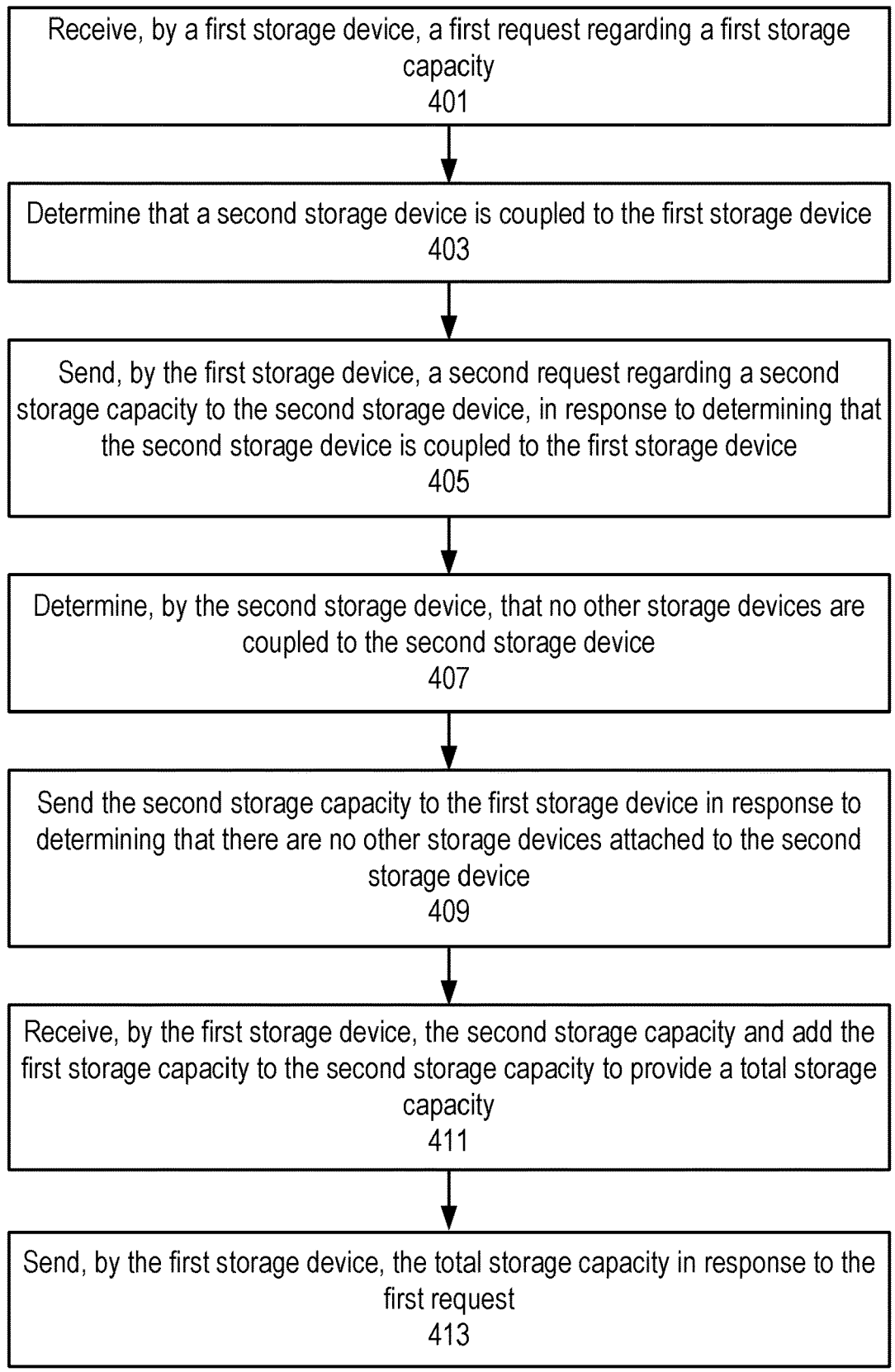
FIG. 4 shows a method for detecting the total storage capacity of storage devices configured in a chain of master/slave storage devices, in accordance with some embodiments.

FIG. 4 shows a method for detecting the total storage capacity of storage devices configured in a chain of master/slave storage devices, in accordance with some embodiments. For example, the method of FIG. 4 can be implemented in the system of FIG. 1. In one example, host device 101 sends request 105 for a storage capacity to storage device 111. Storage device 111 identifies storage device 131 coupled to storage device 111 and reports a total storage capacity in the chain to host device 101.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., controller 117, 137 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, a request for a first storage capacity is received by a first storage device. In one example, the request is request 105. In one example, the first storage device is storage device 111.

At block 403, a second storage device is determined to be coupled to the first storage device. In one example, the second storage device is storage device 131.

At block 405, a second request is sent to the second storage device regarding a second storage capacity, in response to determining that the second storage device is coupled to the first storage device. In one example, the second storage capacity is storage capacity 143.

At block 407, the second storage device determines that no other storage devices are coupled to the second storage device. In one example, storage device 131 determines there are no storage devices coupled to master port 135 of storage device 131.

At block 409, the second storage capacity is sent to the first storage device, in response to determining that no other storage devices are coupled to the second storage device. In one example, storage capacity 143 is reported as a number of logical blocks (LB).

At block 411, the second storage capacity is received by the first storage device and added to the first storage capacity to provide a total storage capacity. In one example, the first storage capacity is storage capacity 123.

At block 413, the total storage capacity is sent by the first storage device to the host device, in response to the first request. In one example, storage device 111 reports storage capacity 123 plus storage capacity 143 as the total storage capacity of storage devices in the chain of storage devices coupled to host device 101. In one example, storage capacity 123 is 200 LB and storage capacity 143 is 100 LB. Total storage capacity reported to host device 101 is 300 LB.

Figure 5:
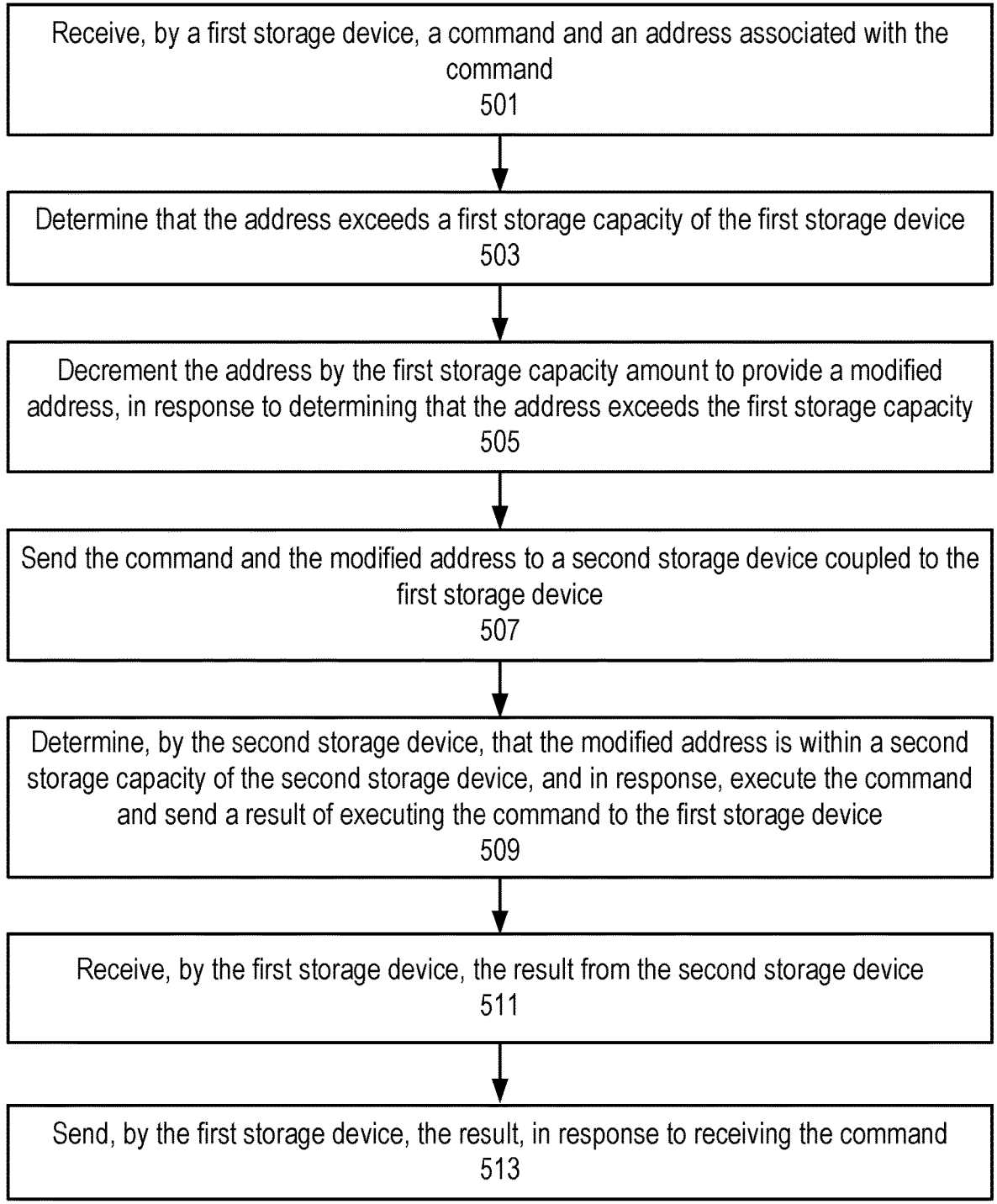
FIG. 5 shows a method for accessing storage devices configured in a chain of master/slave storage devices, in accordance with some embodiments.

FIG. 5 shows a method for accessing storage devices configured in a chain of master/slave storage devices, in accordance with some embodiments. For example, the method of FIG. 5 can be implemented in the system of FIG. 1. In one example, host device 101 sends a command and an address to storage device 111. Storage device 111 identifies that the address exceeds storage capacity 123, generates a modified address, and forwards the command and modified address to storage device 131. Storage device 131 identifies that the modified address is within storage capacity 143 and executes the command. In one example, the command is command 107. In one example, the address is address 109.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices (e.g., controller 117, 137 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, a command and an address associated with the command is received by a first storage device. In one example, the command is a data read command.

At block 503, the address is determined to exceed the first storage capacity of the first storage device. In one example, command 107 is received through slave port 113 of storage device 111.

At block 505, the address is decremented by the amount of the first storage capacity to provide a modified address, in response to determining that the address exceeds the first storage capacity. In one example, the modified address is modified address 121.

At block 507, the command and modified address is sent to a second storage device coupled to the first storage device. In one example, storage device 131 is coupled to master port 115 of storage device 111.

At block 509, the modified address is determined to be within the storage capacity of the second storage device, and in response, the command is executed, and a result of executing the command is sent to the first storage device. In one example, the result of executing the command is sent through slave port 133 of storage device 131 to storage device 111.

At block 511, the result from the second storage device is received by the first storage device. In one example, the result from the second storage device is data requested by a read command.

At block 513, the result is sent by the first storage device to the host device, in response to receiving the command. In one example, master port 103 of host device 101 receives the result from storage device 111.

Figure 6:
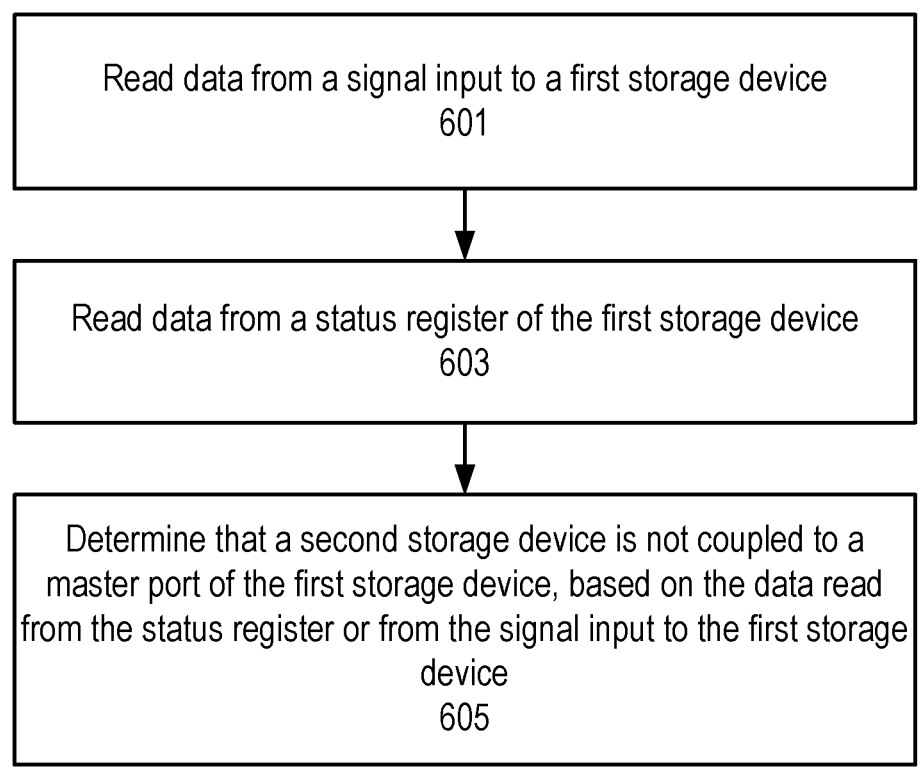
FIG. 6 shows a method for determining storage device connections, in accordance with some embodiments.

FIG. 6 shows a method for determining storage device connections, in accordance with some embodiments. For example, the method of FIG. 6 can be implemented in the system of FIG. 3. In one example, SSD 321 reads data from status register 337 or from slave connected signal 339 to determine that no storage device is coupled to master port 225 of SSD 321.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices (e.g., a controller (not shown) of SSD 321 of FIG. 3).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, data is read from a signal input to the first storage device. In one example, the signal input to the first storage device is slave connected signal 339.

At block 603, data is read from a status register of the first storage device. In one example, the status register is status register 337.

At block 605, a second storage device is determined not to be coupled to the master port of the first storage device, based on the data read from the status register or from the signal input to the first storage device. In one example, the master port is master port 225.

In one embodiment, a method includes: receiving, from a host device (e.g., host device 101) by a first storage device (e.g., storage device 111), a first request (e.g., request 105) regarding a first storage capacity (e.g., storage capacity 123) of the first storage device; in response to the first request, determining, by the first storage device, that a second storage device (e.g., storage device 131) is coupled to the first storage device; and in response to determining that the second storage device is coupled to the first storage device, sending, to the second storage device, a second request regarding a second storage capacity (e.g., storage capacity 143) of the second storage device.

The second storage device is configured to: in response to receiving the second request, determine that no storage device, other than the first storage device, is coupled to the second storage device; and in response to determining that no storage device is coupled to the second storage device, send the second storage capacity to the first storage device.

The method further includes receiving, by the first storage device from the second storage device, the second storage capacity; adding the first storage capacity and the second storage capacity to provide a total storage capacity; and in response to the first request, sending, by the first storage device, the total storage capacity to the host device.

In one embodiment, the host device sends the first request to the first storage device in response to a power up of the host device.

In one embodiment, a slave port (e.g., slave port 133) of the second storage device receives the second request from a master port (e.g., master port 115) of the first storage device; and determining that no storage device is coupled to the second storage device includes determining that no storage device is coupled to a master port (e.g., master port 135) of the second storage device.

In one embodiment, a slave port (e.g., slave port 113) of the first storage device receives the first request from the host device.

In one embodiment, the first storage capacity is a number of logical blocks of data, or a storage size in bytes of data.

In one embodiment, determining that no storage device is coupled to the second storage device includes evaluating at least one of data read from a status register (e.g., status register 337) of the second storage device, or a signal input (e.g., slave connected signal 339) to the second storage device.

In one embodiment, the method further includes: receiving, from the host device by the first storage device, a command (e.g., command 107) and an address (e.g., address 109) associated with the command; determining that the address exceeds the first storage capacity; in response to determining that the address exceeds the first storage capacity, decrementing the address by the first storage capacity to provide a modified address (e.g., modified address 121); and sending, to the second storage device, the command and the modified address.

The second storage device is further configured to: in response to receiving the command, determine that the modified address is within the second storage capacity; in response to determining that the modified address is within the second storage capacity, execute the command; and send, to the first storage device, a result from executing the command.

The method further includes: receiving, by the first storage device from the second storage device, the result; and in response to receiving the command, sending the result to the host device.

In one embodiment, a system includes: memory (e.g., memory 125) to store data for a host device; a first slave port (e.g., slave port 113) to communicate with the host device; a first master port (e.g., master port 115) to communicate with a slave storage device (e.g., storage device 131); and a controller (e.g., controller 117) configured to: receive, on the first slave port from the host device, a first request regarding a first storage capacity of the memory; in response to the first request, determine that the slave storage device is coupled to the first master port; and in response to determining that the slave storage device is coupled to the first master port, send, to the slave storage device, a second request regarding a second storage capacity of the slave storage device.

The slave storage device is configured to: in response to receiving the second request, determine that no storage device is coupled to a second master port (e.g., master port 135) of the slave storage device; and in response to determining that no storage device is coupled to the second master port, send the second storage capacity to the first master port.

The controller is further configured to receive, on the first master port, the second storage capacity; add the first storage capacity and the second storage capacity to provide a total storage capacity; and in response to the first request, send, on the first slave port, the total storage capacity to the host device.

In one embodiment, communications with the host device on the first slave port, and communications with the slave storage device on the first master port are implemented using a wireless interface.

In one embodiment, the system further includes a status register (e.g., status register 327, 337) to store a status for a slave storage device, wherein the status indicates whether a storage device is coupled to a master port of the slave storage device.

In one embodiment, the controller is further configured to: receive, from the host device, a command and an address associated with the command; determine that the address exceeds the first storage capacity; in response to determining that the address exceeds the first storage capacity, decrement the address by the first storage capacity to provide a modified address; and send, to the slave storage device, the command and the modified address.

The slave storage device is further configured to: in response to receiving the command, determine that the modified address is within the second storage capacity; in response to determining that the modified address is within the second storage capacity, execute the command; and send, to the first master port, a result from executing the command.

The controller is further configured to receive, from the slave storage device, the result; and in response to receiving the command from the host device, send the result to the host device.

In one embodiment, the controller is further configured to: receive, from the host device, a command and an address associated with the command; determine that the address is within the first storage capacity; in response to determining that the address is within the first storage capacity, execute the command; and in response to receiving the command from the host device and/or executing the command, send a result to the host device.

In one embodiment, the host device sends the first request in response to a power up of the host device.

In one embodiment, a method includes: receiving, from a host device by a first storage device, a command and an address associated with the command; determining that the address exceeds a first storage capacity of the first storage device; in response to determining that the address exceeds the first storage capacity, decrementing the address by the first storage capacity to provide a modified address; and sending, to a second storage device, the command and the modified address.

The second storage device is configured to: in response to receiving the command, determine that the modified address is within a second storage capacity of the second storage device; in response to determining that the modified address is within the second storage capacity, execute the command; and send, to the first storage device, a result from executing the command.

The method further includes receiving, by the first storage device from the second storage device, the result; and in response to receiving the command from the host device, sending the result to the host device.

In one embodiment, the command is a read, write, or erase request, and the address is a logical block address.

In one embodiment, the method includes: the command is a write command; the method further includes receiving, by the first storage device, data for storage at the address; and the result indicates that the data has been stored.

In one embodiment, the command is a read command, and the result is data read from the second storage device at the modified address.

In one embodiment, the method includes: the first storage capacity corresponds to a first address range; the second storage capacity corresponds to a second address range different from the first address range; the address is outside of the first address range; and the modified address is inside of the second address range.

In one embodiment, the address is a logical block address, and the first address range is a range of logical block addresses.

In one embodiment, the first storage device has a slave port for receiving the command from the host device, and a master port for sending the command to a slave port of the second storage device.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
  receiving, from a host device by a first storage device, a first request regarding a first storage capacity of the first storage device;
  in response to the first request, determining, by reading a first status register disposed in the first storage device, that a second storage device is coupled to the first storage device without employing a separate intermediate controller, the first status register including a first status bit reflecting a coupling of the second storage device and a second status bit reflecting whether the coupling is wireless or not;
  in response to determining that the second storage device is coupled to the first storage device, sending, to the second storage device, a second request regarding a second storage capacity of the second storage device, wherein the second storage device is configured to:
  in response to receiving the second request, determine, by reading a second status register disposed in the second storage device that no storage device, other than the first storage device, is coupled to the second storage device; and
  in response to determining that no storage device is coupled to the second storage device, send the second storage capacity to the first storage device;
receiving, by the first storage device from the second storage device, the second storage capacity;
adding the first storage capacity and the second storage capacity to provide a total storage capacity; and
in response to the first request, sending, by the first storage device, the total storage capacity to the host device.

2. The method of claim 1, wherein the host device sends the first request to the first storage device in response to a power up of the host device.

3. The method of claim 1, wherein:
a slave port of the second storage device receives the second request from a master port of the first storage device; and
determining that no storage device is coupled to the second storage device comprises determining that no storage device is coupled to a master port of the second storage device.

4. The method of claim 3, wherein a slave port of the first storage device receives the first request from the host device.

5. The method of claim 1, wherein the first storage capacity is a number of logical blocks of data, or a storage size in bytes of data.

6. The method of claim 1, wherein determining that no storage device is coupled to the second storage device further comprises evaluating a signal input to the second storage device.

7. The method of claim 1, further comprising:
receiving, from the host device by the first storage device, a command and an address associated with the command;
determining that the address exceeds the first storage capacity;
in response to determining that the address exceeds the first storage capacity, decrementing the address by the first storage capacity to provide a modified address;
sending, to the second storage device, the command and the modified address, wherein the second storage device is further configured to:
  in response to receiving the command, determine that the modified address is within the second storage capacity;
  in response to determining that the modified address is within the second storage capacity, execute the command; and
  send, to the first storage device, a result from executing the command;
receiving, by the first storage device from the second storage device, the result; and
in response to receiving the command, sending the result to the host device.

8. A memory to store data for a host device, the memory comprising:
a first slave port to communicate with the host device;
a first master port to communicate with a slave storage device;
a status register having a first status bit reflecting a coupling of the slave storage device to the first master port without employing a separate intermediate controller and a second status bit reflecting whether the coupling is wireless or not; and
a controller configured to:
  receive, on the first slave port from the host device, a first request regarding a first storage capacity of the memory;
  in response to the first request, determine by reading the status bit that the slave storage device is coupled to the first master port;
  in response to determining that the slave storage device is coupled to the first master port, send, to the slave storage device, a second request regarding a second storage capacity of the slave storage device, wherein the slave storage device is configured to:
    in response to receiving the second request, determine that no storage device is coupled to a second master port of the slave storage device; and
    in response to determining that no storage device is coupled to the second master port, send the second storage capacity to the first master port;
  receive, on the first master port, the second storage capacity;
  add the first storage capacity and the second storage capacity to provide a total storage capacity; and
  in response to the first request, send, on the first slave port, the total storage capacity to the host device.

9. The memory of claim 8, wherein communications with the host device on the first slave port, and communications with the slave storage device on the first master port are implemented using a wireless interface.

10. The memory of claim 8, wherein the controller is further configured to:
receive, from the host device, a command and an address associated with the command;
determine that the address exceeds the first storage capacity;
in response to determining that the address exceeds the first storage capacity, decrement the address by the first storage capacity to provide a modified address;
send, to the slave storage device, the command and the modified address, wherein the slave storage device is further configured to:
  in response to receiving the command, determine that the modified address is within the second storage capacity;
  in response to determining that the modified address is within the second storage capacity, execute the command; and
  send, to the first master port, a result from executing the command;
receive, from the slave storage device, the result; and
in response to receiving the command from the host device, send the result to the host device.

11. The memory of claim 8, wherein the controller is further configured to:
receive, from the host device, a command and an address associated with the command;
determine that the address is with in the first storage capacity;
in response to determining that the address is within the first storage capacity, execute the command; and
in response to executing the command, send a result to the host device.

12. The memory of claim 8, wherein the host device sends the first request in response to a power up of the host device.

13. A method comprising:
receiving, from a host device by a first storage device, a command and an address associated with the command;
determining that the address exceeds a first storage capacity of the first storage device;
in response to determining that the address exceeds the first storage capacity, reading a status register disposed in the first storage device, and in response to the status register indicating that a second storage device is coupled to the first storage device without employing a separate intermediate controller, decrementing the address by the first storage capacity to provide a modified address, wherein the status register includes a first status bit reflecting the coupling and a second status bit reflecting whether the coupling is wireless or not;
sending, to the second storage device, the command and the modified address, wherein the second storage device is configured to:
  in response to receiving the command, determine that the modified address is within a second storage capacity of the second storage device;
  in response to determining that the modified address is within the second storage capacity, execute the command; and
  send, to the first storage device, a result from executing the command;
receiving, by the first storage device from the second storage device, the result; and
in response to receiving the command from the host device, sending the result to the host device.

14. The method of claim 13, wherein the command is a read, write, or erase request, and the address is a logical block address.

15. The method of claim 13, wherein:
the command is a write command;
the method further comprises receiving, by the first storage device, data for storage at the address; and
the result indicates that the data has been stored.

16. The method of claim 13, wherein the command is a read command, and the result is data read from the second storage device at the modified address.

17. The method of claim 13, wherein:
the first storage capacity corresponds to a first address range;
the second storage capacity corresponds to a second address range different from the first address range;
the address is outside of the first address range; and
the modified address is inside of the second address range.

18. The method of claim 17, wherein the address is a logical block address, and the first address range is a range of logical block addresses.

19. The method of claim 13, wherein the first storage device has a slave port for receiving the command from the host device, and a master port for sending the command to a slave port of the second storage device.

* * * * *